United States Patent [19]
Fletcher et al.

[11] 3,790,795
[45] Feb. 5, 1974

[54] HIGH FIELD CDS DETECTOR FOR INFRARED RADIATION

[76] Inventors: James C. Fletcher, Administrator of the National Aeronautics and Space Administration, with respect to an invention of; Ramesh C. Tyagi, Delhi, India; James B. Robertson, Yorktown, Va.; Karl W. Boer, Kennett Square, Pa.; Henry C. Hadley, Jr., Newark, Del.

[22] Filed: July 26, 1972

[21] Appl. No.: 275,118

[52] U.S. Cl. ............... 250/338, 250/370, 250/371
[51] Int. Cl. .......................................... G01j 1/02
[58] Field of Search. 250/83 R, 83.3 H, 211 R, 338, 250/370, 371

[56] References Cited
UNITED STATES PATENTS

| | | | |
|---|---|---|---|
| 3,449,705 | 6/1969 | Chamberlin | 250/211 R X |
| 3,602,721 | 8/1971 | Nakamura et al. | 250/211 R X |
| 3,636,354 | 1/1972 | Leheny et al. | 250/83.3 H |
| 3,340,427 | 9/1967 | Bisso | 250/211 R X |
| 3,501,638 | 3/1970 | Compton et al. | 250/83.3 H |

*Primary Examiner*—Archie R. Borchelt
*Attorney, Agent, or Firm*—John R. Manning; Howard J. Osborn; William H. King

[57] ABSTRACT

An infrared radiation detector including a cadmium sulfide (CdS) platelet having a cathode formed on one of its ends and an anode formed on its other end. The platelet is suitably doped such that stationary high-field domains are formed adjacent the cathode when biased in the negative differential conductivity region. A negative potential is applied to the cathode such that a high-field domain is formed adjacent to the cathode. A potential measuring probe is located between the cathode and the anode at the edge of the high-field domain and means are provided for measuring the potential at the probe whereby this measurement is indicative of the infrared radiation striking the platelet.

6 Claims, 2 Drawing Figures

HIGH FIELD CDS DETECTOR FOR INFRARED RADIATION

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

The invention relates generally to radiation detectors and more specifically concerns a sensitive infrared radiation detector.

The present invention is the result of an effort to look for a new type of more sensitive solid state infrared detector near room temperature than the usual photoconductor, low band gap semiconductor devices. It is known that cadmium sulfide is sensitive to infrared radiation and that the photocurrent can either be enhanced or quenched, depending on the wavelength of optical excitation. However, the observed effect is usually not strong enough to make cadmium sulfide an attractive infrared detector, since it is caused by shifting the characteristics of a cadmium sulfide crystal between the sensitized and non-sensitized state. This shift needs, for the quenching operation, a considerable amount of infrared intensity to unmask the fast recombination path before it can be observed. That is, infrared quenching becomes marked only above a certain threshold intensity which is related to the intensity of photoexcitation. Though the threshold infrared intensity decreases with decreasing photo-excitation, the infrared sensitivity decreases at attractive low intensities, since the cadmium sulfide loss its electronic sensitization, hence infrared radiation reduces the current only very little. This is the major reason why cadmium sulfide, though very sensitive to visible light, has not been used as a sensitive infrared detector.

SUMMARY OF THE INVENTION

This invention is a highly sensitive method and apparatus for detecting infrared radiation in the quenching range by utilizing stationary cathode-adjacent high-field domains. Here, in addition to unmasking of the fast recombination path by partial field quenching, the change of the width of the high-field domain caused by infrared quenching is used to detect such infrared radiation. Since the field decreases very steeply at the domain edge a potential probe located at this edge can detect shifts in the position of the domain with a very high sensitivity. This method can detect infrared radiation with considerably higher sensitivity than the currently used methods of photocurrent detection.

The apparatus for carrying out the method of this invention includes a cadmium sulfide platelet, with a cathode and an anode formed on its ends, which is suitably doped such that stationary high-field domains are formed adjacent the cathode when biased in the negative differential conductivity region. A negative potential is applied to the cathode such that a high-field domain is formed adjacent to the cathode. A potential measuring probe is placed between the cathode and the anode at the edge of the high-field domain, and means are provided for measuring the potential at the probe. The potential measured at the probe is indicative of the infrared radiation striking the platelet.

DETAILED DESCRIPTION OF THE INVENTION

Figure 1:
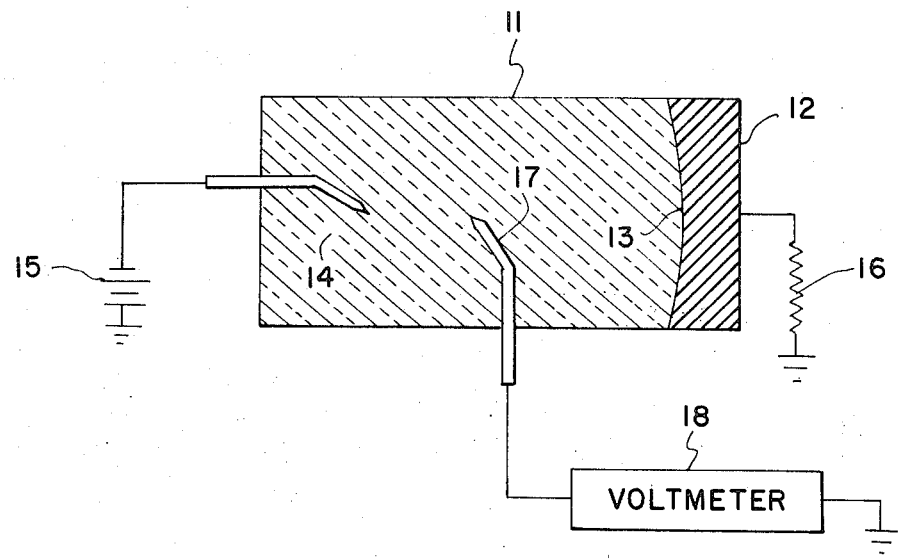
FIG. 1 is a schematic diagram of a preferred embodiment of the invention.

Turning now to the embodiment of the invention selected for illustration in the drawings, the number 11 in FIG. 1 designates a cadmium sulfide platelet. Platelet 11 is prepared by a vapor transport method in an $N_2$-$H_2S$ atmosphere and doped by baking at 900°C. for 3 hours while buried in a cadmium sulfide powder containing 50 ppm AG and Al as nitrates. This insures that cathode adjacent stationary high-field domains are formed when biased in the negative differential conductivity (NDC) region. "Negative differential conductivity region" is the region of electric field strength in which the conductivity decreases with increasing electric field strength. To bias in the NDC region is to apply across the platelet a voltage strong enough to produce NDC in the platelet. A Ti-Al anode 12 is vacuum-deposited on one end of platelet 11 in the form of an arc 13 of a circle. At the other end of platelet 11 and at the center of arc 13 is a tungsten point cathode 14. A negative d.c. voltage 15 is connected between cathode 14 and ground, and a current-limiting resistor 16 is connected between anode 12 and ground. Another sharp tungsten probe 17 is placed between anode 13 and cathode 14 to measure the change in potential distribution occurring inside the platelet when it is exposed to infrared radiation. A high impedance voltmeter is connected between the probe 17 and ground to measure the potential at probe 17.

Figure 2:
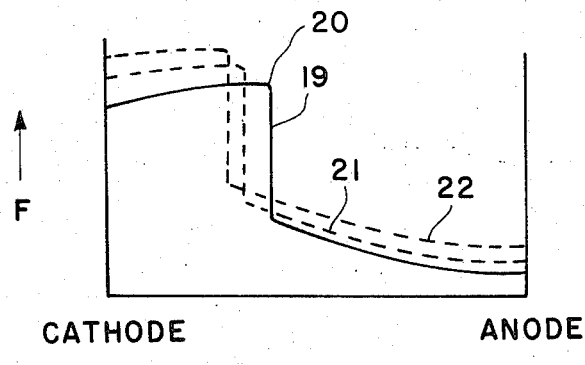
FIG. 2 is a graph for the purpose of describing the theory of operation of the embodiment of the invention in FIG. 1.

It has been found that a negative 2,000 volts as voltage source 15 is adequate to provide a cathode adjacent high-field domain in the platelet 11. With this voltage applied to cathode 14 and with platelet 11 not being exposed to any infrared radiation, probe 17 is moved along a radius r of arc 13 from cathode 14 to the anode 12, and voltages are read on voltmeter 18. When these voltages are read they are plotted on the graph in FIG. 2 to obtain the solid curve 19. As is noted from curve 19, the high-field domain extends to the point 20 which is the knee of the curve. At this point, the voltage drops to a much lower field. When platelet 11 is subjected to a certain amount of infrared radiation, the curve 21 in FIG. 2 is obtained, and when platelet 11 is subjected to another level of infrared radiation, the curve 22 is obtained. Consequently, as noted in FIG. 2, if probe 17 were placed at the point 20 and if platelet 11 were subjected to any infrared radiation there would be a sudden drop in the voltage read by voltmeter 18. This reading on voltmeter 18 would be indicative of the amount of radiation that platelet 11 is subjected to. Hence, if voltmeter 18 is calibrated for different levels of radiation, it can be used to directly read the infrared radiation that is striking platelet 11 at any given moment.

The range of intensity measurement can be affected by altering the position of probe 17 with respect to the cathode and anode, and by extending the high-field domain edge, which can be controlled by adjusting the applied voltage 15. Sensitivity can also be altered by changing the intensity of the band edge illumination.

The advantage of this invention is that it provides a method and apparatus of measuring infrared radiation that is inexpensive and more sensitive than previous infrared radiation detecting devices.

It is to be understood that the form of the invention herewith shown and described is to be taken as a preferred embodiment. Various changes may be made in the invention without departing from the spirit and scope of the invention as defined in the subjoined claims. For example, the shape of the platelet 11 could be an isoseles triangle with the cathode placed at the apex instead of the rectangular shape as shown. Also, different anode, cathode and probe arrangements could be made without departing from the invention.

What is claimed as new and desired to be secured by Letters Patent of the United States is:

1. An infrared radiation detector comprising:
   a cadmium sulfide platelet;
   a cathode formed on one end of said platelet;
   an anode formed on the other end of said platelet;
   said platelet being suitably doped such that stationary high-field domains are formed adjacent to said cathode when biased in the negative differential conductivity region;
   a negative potential applied to said cathode such that a high-field domain is formed adjacent to said cathode;
   a potential measuring probe between said cathode and said anode at the edge of said high-field domain; and
   means for measuring the potential at said probe whereby said measurement is indicative of the infrared radiation striking said platelet.

2. An infrared radiation detector according to claim 1 wherein said anode is a Ti-Al electrode on said other end of platelet in the form of an arc of a circle.

3. An infrared radiation detector according to claim 2 wherein said cathode is a point electrode on said platelet at the center of said arc.

4. An infrared radiation detector according to claim 3 wherein said measuring probe is a point electrode on said platelet.

5. An infrared radiation detector according to claim 4 wherein said negative potential is connected between said cathode and ground, a resistor is connected between said anode and ground to limit current, and said measuring means is connected between said probe and ground.

6. A method for making an infrared radiation detector comprising the steps of:
   providing a cadmium sulfide platelet;
   doping said platelet such that cathode adjacent stationary high-field domains are formed when biased in the negative differential conductivity region;
   positioning a cathode at one end of said platelet;
   positioning an anode at the other end of said platelet;
   applying a negative potential to said cathode to form a high-field domain adjacent said cathode while said platelet is not subjected to any infrared radiation; and
   positioning an electrode at the edge of said high-field domain whereby the potential at said electrode is indicative of the infrared radiation striking said platelet.

* * * * *